No. 883,876. PATENTED APR. 7, 1908.
J. HALBARDIER.
POTATO DIGGER AND SEPARATOR.
APPLICATION FILED SEPT. 23, 1904.

4 SHEETS—SHEET 1.

WITNESSES:
CS. Middleton
L. B. Middleton

INVENTOR
JOSEPH HALBARDIER
BY-
HIS ATTORNEY.

No. 883,876. PATENTED APR. 7, 1908.
J. HALBARDIER.
POTATO DIGGER AND SEPARATOR.
APPLICATION FILED SEPT. 23, 1904.

4 SHEETS—SHEET 2.

WITNESSES,
George G. Schoenlank
W. H. Berrigan

INVENTOR,
JOSEPH HALBARDIER,
BY H van Oldenneel
HIS ATTORNEY.

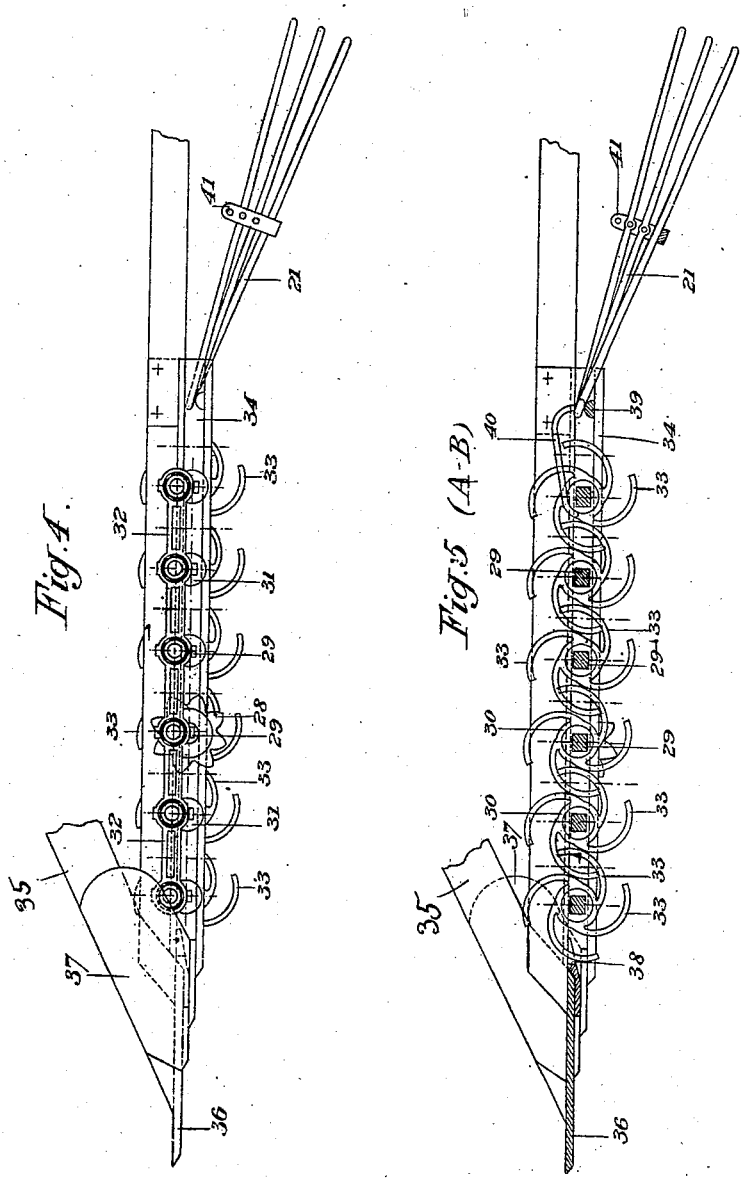

No. 883,876. PATENTED APR. 7, 1908.
J. HALBARDIER.
POTATO DIGGER AND SEPARATOR.
APPLICATION FILED SEPT. 23, 1904.

4 SHEETS—SHEET 4.

WITNESSES;
George G. Schoenlank
A. H. Berrigan

INVENTOR,
JOSEPH HALBARDIER,
BY H. Van Oldenneel
HIS ATTORNEY.

UNITED STATES PATENT OFFICE.

JOSEPH HALBARDIER, OF BAR, ETHE, BELGIUM.

POTATO DIGGER AND SEPARATOR.

No. 883,876.  Specification of Letters Patent.  Patented April 7, 1908.

Application filed September 23, 1904. Serial No. 225,688.

To all whom it may concern:

Be it known that I, JOSEPH HALBARDIER, farmer, a subject of the Kingdom of Belgium, residing at Bar, Ethe, Belgium, have invented a new and useful Improvement in Potato Diggers and Separators; and I do hereby declare the following to be a full, clear, and exact description of the same.

My present invention relates to potato-diggers and separators, the object being to provide an improved implement of this class, whereby the earth-clods and potatoes are dug by means of a share and then brought upon a series of successive drums, provided with radially arranged arms or fingers, rotating in a direction opposite to the movement of the carriage, said fingers acting to alternately raise and lower the materials, whereby the clods are broken and crushed.

A further object of the invention is to arrange the rotating fingers so as to avoid stopping up of the drums by roots and weeds and prevent the potatoes from being crushed or otherwise injured.

A still further object of this invention is to provide a potato-digger and separator having a suspended grating at the rear end, whereupon the potatoes are caused to drop for the purpose of further cleansing the same.

With these and other objects in view, my invention consists of the construction, combination and arrangement of parts, fully described and claimed hereinafter.

Figure 1:
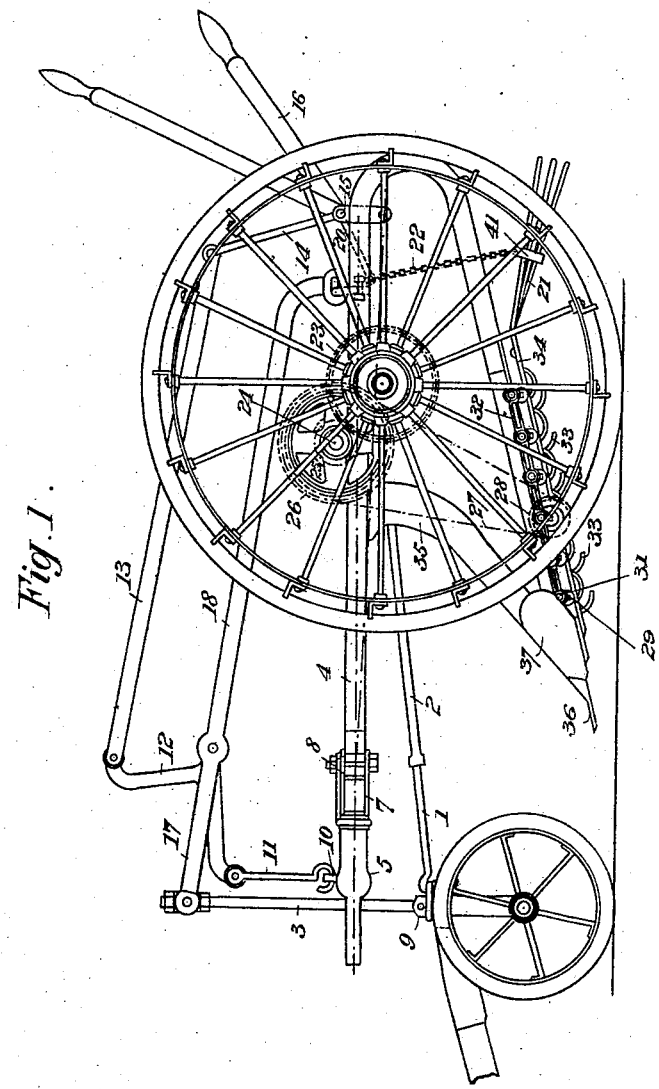
Figure 2:
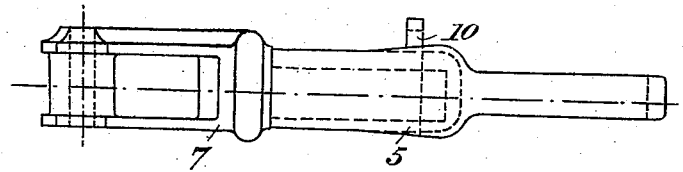
Figure 3:
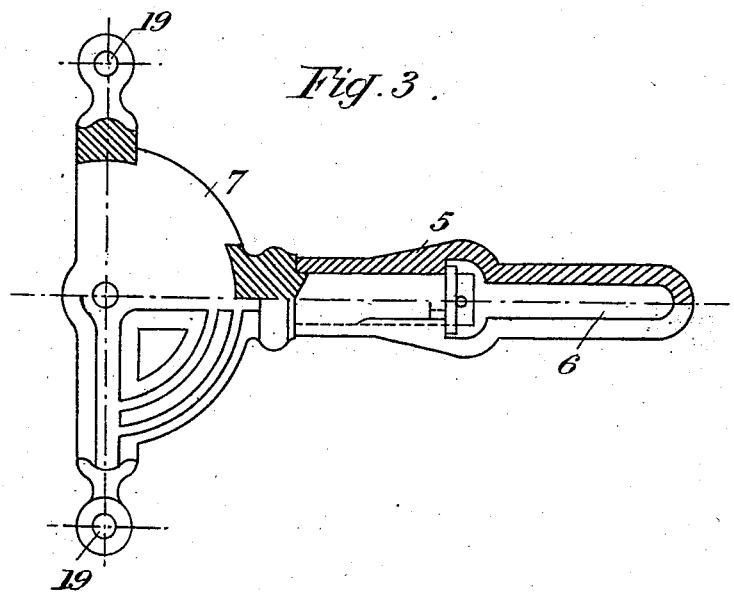
Figure 6:
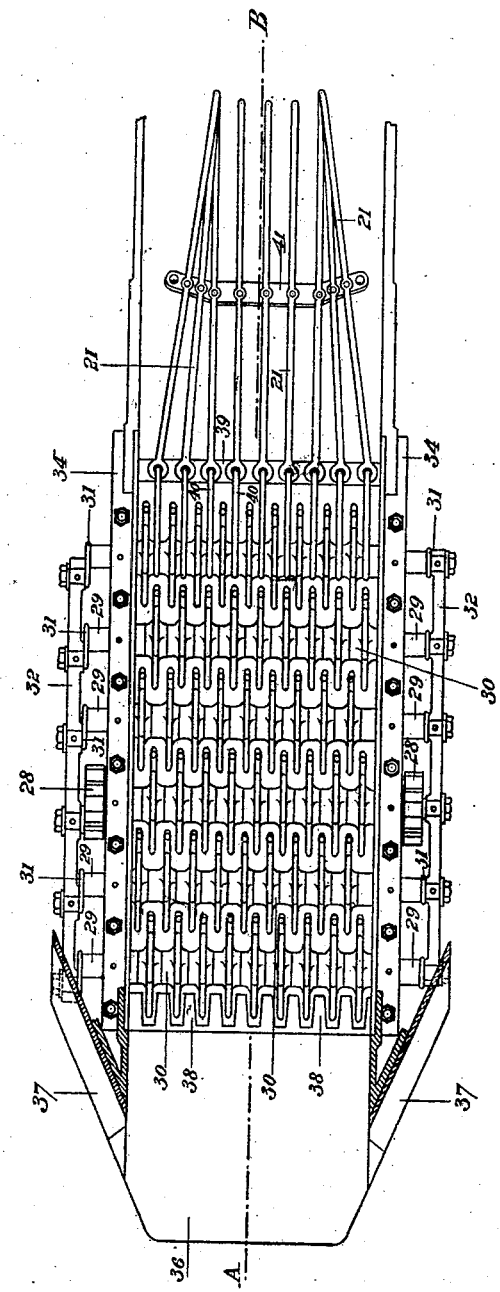

In the accompanying drawings: Figure 1 is a side elevation of the improved potato-digger and separator. Fig. 2 is an enlarged side-view of the fore-perch. Fig. 3 is a top plan view with parts in section of same. Fig. 4 is an enlarged side-elevation of the separator and grating. Fig. 5 is a vertical section of same; and Fig. 6 is a top plan view of same.

Like numerals refer to like parts throughout all the views.

Referring to the drawings, 1 is a connecting bar and 2 a yoke, said bar and yoke serving to connect the two axles of the implement.

3 is a vertical post, secured to the axle of the fore-wheels and passing through an oblong eye provided in the perch, to guide the same.

4 represents the perch carrying the working parts of the implement and provided at its fore-end, with a steering head (Figs. 2 and 3), connected in such manner that the perch may be moved freely in either direction.

Said steering head consists of a socket 5 provided with an oblong eye 6 for the passage of the post 3 and rotatably coupled with a semi-circular guide-plate 7. The fore-end of the perch 4 extends into the hollow space of the plate 7 and is connected with the same by means of a bolt 8, so that it may oscillate freely in a horizontal plane, whereby the share may move laterally as desired. The connection between the socket 5 and the post 3 permits of imparting to the share a vertical movement, which may be limited as desired in accordance with the nature of the soil, by means of a ring 9 provided with a set-screw. The perch is mechanically connected with the hand-lever 16 at the rear of the machine through the medium of the eye 10, the hook 11, the bellcrank lever 12, the rod 13, the arm 14 and the shaft 15, whereby the carman may easily raise and lower the perch, oscillating on the rear axle. The bellcrank lever 12 is fulcrumed in the fork 17 of a support 18, connected to the upper end of the post 3 and the rear part of the perch. The guide plate 7 has side eyes 19, 19 for the use of rods connecting the plate with the steering lever of the machine.

Arranged on the shaft 15 of the hand-lever 16 is another lever 20, to the end of which is attached the chain 22 supporting the grating 21, the arrangement being such that when the carman depresses the hand-lever 16 for raising the share, the grating is raised at the same time.

The rear axle carries, in its central part, a toothed wheel 23, adapted to mesh with and actuate a toothed pinion 25, arranged on a shaft 24 carried by the perch and provided with two lateral chain-wheels 26, connected by means of chains 27 with the wheels 28 arranged on the separator, that is, on the shaft 29 of one of the rotating drums 30, the shafts of which are interconnected on both sides by means of cranks 31 and connecting rods 32. The separator consists of a number of drums 30, provided with forwardly bent, sickle-shaped fingers or arms 33, and the shafts 29 of which are journaled in bearings 34, 34 connected with the share and the perch. These arms are shaped to conform with an arc of a circle and may vary from an arc of 90° to an arc of 180°, those shown in the drawings being approximately semi-circular. The drums carrying the arms are so adjusted, and the arms are so arranged on the drums that the arms of one drum pass between the arms of the adjacent drum; their relation being such that the arms of the rear drum rise above a horizontal position before the arms of the forward drum have advanced far enough to discharge the clods, thus the clods are constantly supported by the arms and have a continuous rearward movement.

Arranged in front of the separator is the share 36 carried by the support 35 (Fig. 1) and provided with two lateral mold-boards 37, 37. The inner rim of the share is provided with fixed projecting teeth 38, between which move the curved fingers of the first drum, for the purpose of frictionally engaging the dug clods and potatoes and bringing them further backwards.

The bearings 34 are connected at their rear ends by means of a cross-bar 39 supporting the ends of the grate-bars 21 loosely connected to the levers 40 resting on the last drum 30. The central portion of the grating carries a cross-rail 41, to which the bars are secured and whose ends are bent upwardly and attached to the chain 22 already described.

The improved implement operates as follows: The share 36 being lowered, the dug clods and potatoes arrive upon the rear end of the same where they are elevated and carried away by the curved fingers or arms of the first rotating drum, until the clods have reached the ends of said fingers and drop into the open space between the fingers, whereby the clods are crushed and the potatoes caused to move or glide backwardly. It will be noted that the curved fingers, the curvature of which is opposite to the direction of working of the drums, are gliding under the clods which are carried away by friction, whereby the stopping up of the drums by weeds or roots is prevented. The alternate abrupt raising and dropping of the potatoes from one drum to the next causes the same to be effectively separated from the adhering earth, without it being possible that the potatoes are crushed or otherwise injured by the drums or the fingers thereof. Upon leaving the last drum, the potatoes drop upon the grating 21, where weeds and roots, which might still adhere, are separated by the oscillations of the suspended grating. The potatoes are prevented from dropping laterally upon the rows which are not yet dug, by the upwardly curved sides of said grating.

Having fully described my invention, what I claim and desire to secure by Letters Patent is:—

1. In a potato digger and separator, the combination with the perch, the digging share and means for controlling the position of said perch, of longitudinally arranged bearings secured to the perch and the share, a series of transversely arranged drums journaled in said bearings, radial arms on said drums, said arms being shaped to conform to the arc of a circle and each extending through a circular arc between 90° and 180°, and means for rotating said drums, substantially as described.

2. In a potato digger and separator, the combination with the perch, the digging share and means for controlling the position of said perch, of longitudinally arranged bearings secured to the perch, and the share, a series of transversely arranged drums journaled in said bearings, radial curved arms on said drums and each extending through a circular arc between 90° and 180°, said arms being so adjusted that the upwardly moving arms intersect the line of movement of the downwardly moving arms at a point above the horizontal axial plane of the drums and means for rotating said drums, substantially as described.

In testimony whereof, I have signed my name to this specification in the presence of two subscribing witnesses.

JOSEPH HALBARDIER.

Witnesses:
   CHARLES HOWARD,
   GREGORY PHELAN.